(12) United States Patent
Kobayashi et al.

(10) Patent No.: US 12,497,167 B2
(45) Date of Patent: Dec. 16, 2025

(54) THRUST GENERATOR FOR ROTORCRAFT

(71) Applicant: HONDA MOTOR CO., LTD., Tokyo (JP)

(72) Inventors: Ryuzaburo Kobayashi, Saitama (JP); Manabu Yazaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 76 days.

(21) Appl. No.: 18/415,848

(22) Filed: Jan. 18, 2024

(65) Prior Publication Data

US 2024/0300642 A1    Sep. 12, 2024

(30) Foreign Application Priority Data

Mar. 8, 2023 (JP) .................................. 2023-035246

(51) Int. Cl.
*B64C 27/32* (2006.01)

(52) U.S. Cl.
CPC .................................... *B64C 27/32* (2013.01)

(58) Field of Classification Search
CPC ........ B64D 27/30; B64D 27/31; B64D 27/34; B64D 27/35; B64D 35/026; B64D 2221/00; B64C 27/32; B64C 27/58; B64C 27/68; B64C 29/003; B64C 39/024; B64C 2203/00; B64U 10/10; B64U 10/20; B64U 50/19; B64U 50/23; B64U 50/30
See application file for complete search history.

(56) References Cited

U.S. PATENT DOCUMENTS

| | | | |
|---|---|---|---|
| 2011/0284688 A1* | 11/2011 | Chuc .................. | B64D 45/02 416/147 |
| 2019/0118941 A1* | 4/2019 | Iskrev .................. | B64C 11/32 |
| 2020/0318676 A1* | 10/2020 | Itagaki ................ | F16D 1/027 |
| 2023/0019240 A1* | 1/2023 | Xiao ................... | B64C 27/32 |
| 2024/0128819 A1* | 4/2024 | Belzille .............. | B64D 35/026 |

FOREIGN PATENT DOCUMENTS

CA          3096221 A1    4/2022

* cited by examiner

*Primary Examiner* — Nathaniel E Wiehe
*Assistant Examiner* — Maxime M Adjagbe
(74) *Attorney, Agent, or Firm* — Armstrong Teasdale LLP

(57) ABSTRACT

A thrust generator for a rotorcraft includes: a support part conductively mounted to a conductive base provided in the rotorcraft; a rotor shaft rotatably and conductively supported by the support part; multiple rotating blades joined to the rotor shaft; and a drive unit mounted to the support part via a first electrically insulating part, wherein an output shaft of the drive unit is connected to the rotor shaft via a second electrically insulating part.

7 Claims, 9 Drawing Sheets

THRUST GENERATOR FOR ROTORCRAFT

TECHNICAL FIELD

The present invention relates to a thrust generator for a rotorcraft.

BACKGROUND ART

CA3096221A1 discloses a thrust generator for a rotorcraft. The thrust generator includes a rotor shaft provided with rotating blades, multiple electric motors, and multiple belt transmission mechanisms (belt pulleys) connecting the rotor shaft to the multiple electric motors. Since the rotor shaft is connected to the electric motor via the belts having high electrical resistance, even if lightning strikes the rotating blades, flow of the lightning surge to the electric motor can be prevented.

However, there is a problem that the use of the belt transmission mechanisms increases the size of the thrust generator in the radial direction of the rotor shaft.

SUMMARY OF THE INVENTION

In view of the foregoing background, a primary object of the present invention is to suppress increase in size of the thrust generator while preventing the flow of lightning surge to the drive unit of the thrust generator.

To achieve the above object, one aspect of the present invention provides a thrust generator (10) for a rotorcraft (1), the thrust generator comprising: a support part (14) conductively mounted to a conductive base (11) provided in the rotorcraft; a rotor shaft (15) rotatably and conductively supported by the support part; multiple rotating blades (16) joined to the rotor shaft; and a drive unit (18) mounted to the support part via a first electrically insulating part (115), wherein an output shaft (71) of the drive unit is connected to the rotor shaft via a second electrically insulating part (116).

According to this aspect, lightning surge generated in the rotating blades and the rotor shaft flows to the base, and is difficult to flow to the drive unit. Also, since the support part and the drive unit can be arranged close to each other, increase in size of the thrust generator can be suppressed. Thus, it is possible to suppress increase in size of the thrust generator while preventing the flow of lightning surge to the drive unit of the thrust generator.

Preferably, one of the rotor shaft and the output shaft of the drive unit is provided with a spline shaft part (93), an other of the rotor shaft and the output shaft of the drive unit is provided with a spline hole (94) into which the spline shaft part is fitted, and the second electrically insulating part is an electrically insulating film formed on at least one of the spline shaft part and the spline hole.

According to this aspect, while increase in size is suppressed, the rotor shaft and the output shaft of the drive unit can be connected in a state electrically insulated from each other.

Preferably, the first electrically insulating part is an electrically insulating material that is independent from and interposed between the support part and the drive unit.

According to this aspect, the support part and the drive unit can be electrically insulated from each other with a simple configuration.

The first electrically insulating part may be an electrically insulating film formed on at least one of the support part and the drive unit.

According to this aspect, the support part and the drive unit can be electrically insulated from each other with a simple configuration.

Preferably, the base has a mounting hole penetrating therethrough in an up-down direction, the support part includes a main body that is tubular in shape and rotatably supports the rotor shaft and multiple arm parts extending radially outward from the main body, the multiple arm parts are mounted to an edge part of the mounting hole, and each arm part is provided with a rib extending from the main body toward a tip of the arm part.

According to this aspect, since the ribs increase the cross-sectional area of the arm parts, the electrical resistance of the arm parts is lowered, and thus, lightning surge easily flows to the base via the arm parts.

Preferably, the rotor shaft extends upward from the mounting hole, the rotating blades are joined to an upper end of the rotor shaft, and a lower end of the drive unit is disposed lower than the base.

According to this aspect, lightning is more likely to strike the rotating blade and the rotor shaft than the drive unit, and thus, the drive unit is protected from the lightning surge.

Preferably, the support part is provided with a conductive brush (113) that slidably contacts an outer circumferential surface of the rotor shaft.

According to this aspect, the lightning surge easily flows from the rotor shaft to the support part, and thus is difficult to flow to the output shaft of the drive unit.

Preferably, each of the drive unit and the output shaft is made of a material having an electrical conductivity lower than that of the base.

According to this aspect, the lightning surge flows more easily from the rotor shaft and the support part to the base than to the drive unit and the output shaft. Therefore, the drive unit is protected from the lightning surge.

According to the foregoing configuration, it is possible to suppress increase in size of the thrust generator while preventing the flow of lightning surge to the drive unit.

DETAILED DESCRIPTION OF THE INVENTION

In the following, a thrust generator according to an embodiment of the present invention and a planetary gear mechanism of the thrust generator will be described with reference to the drawings. The thrust generator is used in a rotorcraft which may be called an electric multicopter.

Figure 1:
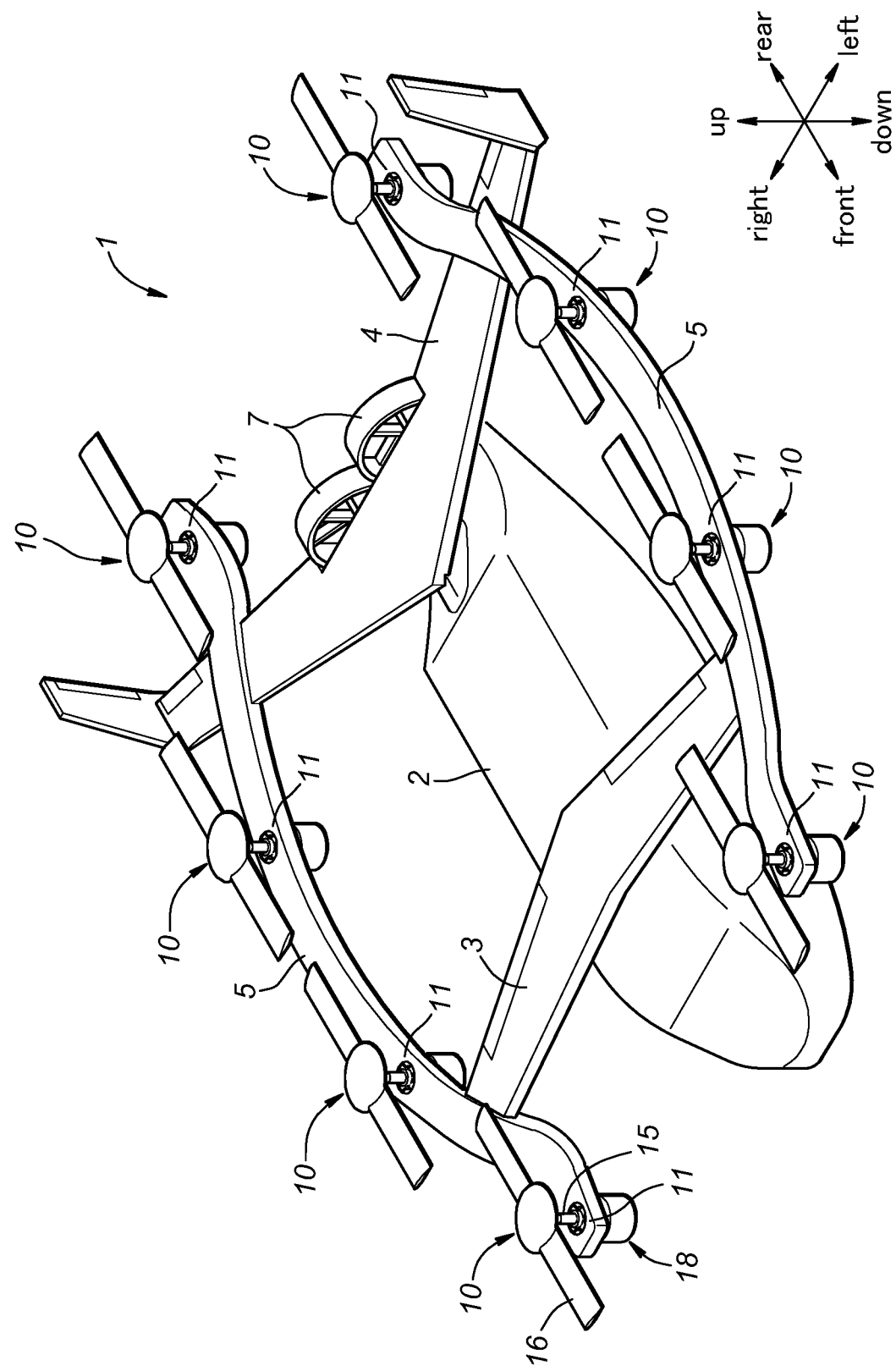
FIG. 1 is a perspective view of a rotorcraft.
Figure 2:
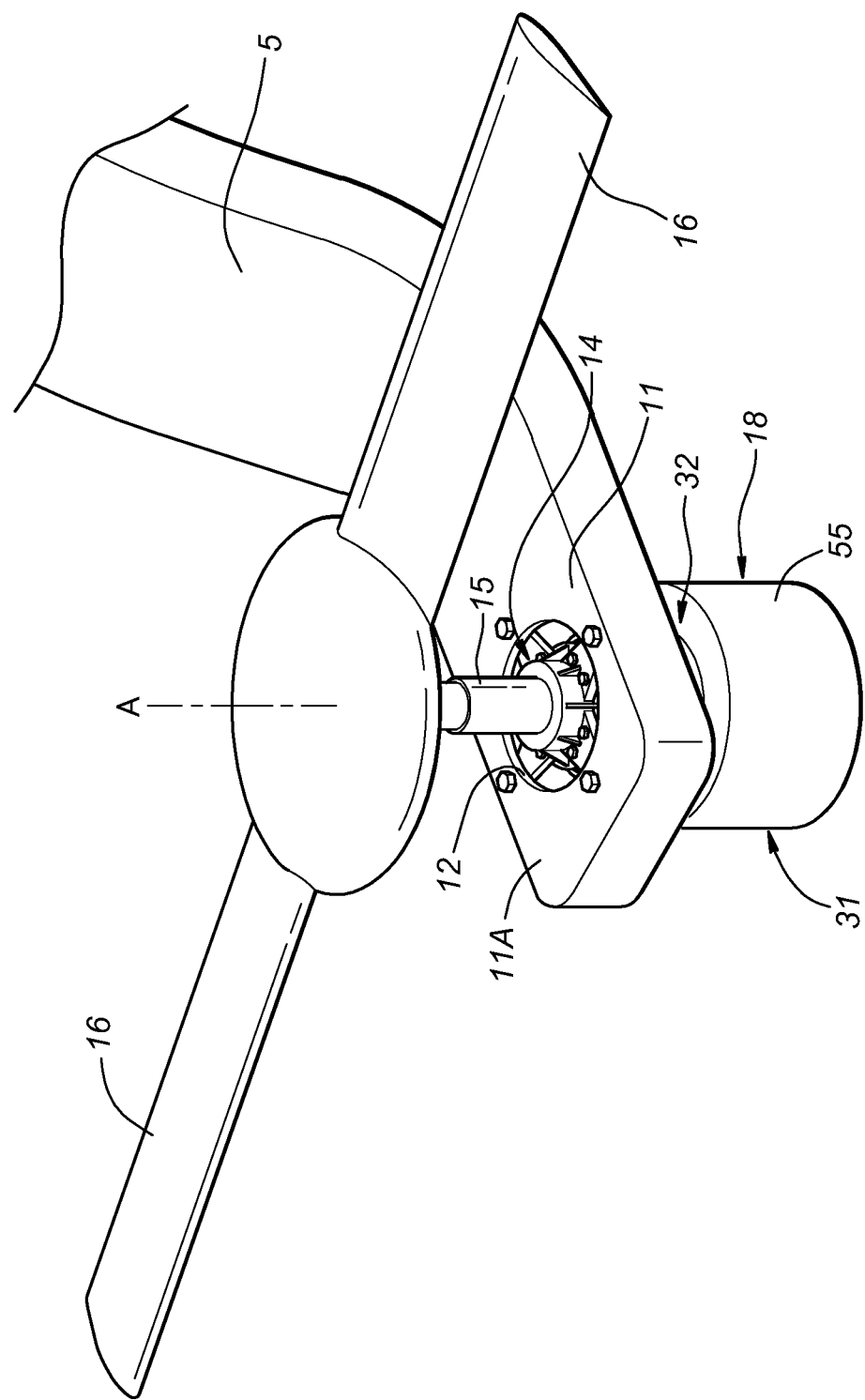
FIG. 2 is a perspective view of a thrust generator.

As shown in FIG. 1, a rotorcraft 1 includes a main body 2 extending in the front-rear direction, a front wing 3 and a rear wing 4 each extending laterally from the main body 2, and left and right arm 5 each extending in the front-rear direction and joined to the front wing 3 and the rear wing 4. The main body 2 may be provided with a cabin for an occupant. At the rear end of the main body 2, a pair of rear thrust generators 7 for generating thrust in the front-rear direction is provided. The front wing 3 and the rear wing 4 are preferably formed in a shape to generate lift when the rotorcraft 1 moves forward.

Each arm 5 is provided with multiple thrust generators 10. Each thrust generator 10 generates thrust in the up-down direction. The thrust generators 10 are arranged on each arm 5 at intervals in the front-rear direction so as not to interfere with each other. Each arm 5 is provided with multiple bases 11 to which the multiple thrust generators 10 are mounted.

Each base 11 has the same configuration. Also, each thrust generator 10 has the same configuration. Thus, in the following, description will be made of a single thrust generator 10.

As shown in FIGS. 2 to 5, the base 11 is provided in the arm 5, and includes an upper surface 11A and a lower surface 11B. The upper surface 11A and the lower surface 11B are preferably horizontal surfaces. The base 11 has a mounting hole 12 penetrating therethrough in the up-down direction. The mounting hole 12 opens in the upper surface 11A and the lower surface 11B. The mounting hole 12 preferably is a circular hole.

The thrust generator 10 includes a support part 14 detachably mounted to the base 11, a rotor shaft 15 rotatably supported by the support part 14, multiple rotating blades 16 joined to the rotor shaft 15, and a drive unit 18 detachably mounted to the support part 14 or the base 11.

The support part 14 includes a tubular main body 21 that rotatably supports the rotor shaft 15 and multiple arm parts 22 extending radially outward from the main body 21. The main body 21 is formed in a cylindrical shape that extends vertically. At the center of the main body 21, a bearing hole 23 penetrating therethrough vertically is provided. The lower end of the main body 21 is provided with a flange 24 which extends radially outward.

The multiple arm parts 22 extend radially from the lower end portion of the main body 21. Each arm part 22 is preferably joined to the main body 21 and the flange 24. The multiple arm parts 22 are detachably mounted to an edge part 25 of the mounting hole 12. With the multiple arm parts 22, the support part 14 is detachably mounted to the edge part 25 of the mounting hole 12. In the present embodiment, an upper surface of the tip of each of the multiple arm parts 22 is fastened to the lower surface 11B of the base 11. In another embodiment, a lower surface of the tip of each of the multiple arm parts 22 may be fastened to the upper surface 11A of the base 11. Preferably, each arm part 22 and the base 11 are detachably fastened to each other by means of a fastener 27, such as a bolt and a nut, for example.

In a state in which the support part 14 is mounted to the base 11, the main body 21 is disposed inside the mounting hole 12 as seen in the up-down direction. The main body 21 extends vertically and passes through the mounting hole 12. The main body 21 is formed to have a diameter smaller than the diameter of the mounting hole 12.

The rotor shaft 15 extends vertically and is rotatably supported in the bearing hole 23 via a bearing 29. An upper end of the rotor shaft 15 protrudes upward from the upper end of the main body 21. Also, the rotor shaft 15 extends upward from the mounting hole 12. The multiple rotating blades 16 are joined to the upper end of the rotor shaft 15. Each rotating blade 16 extends radially, with the rotor shaft 15 being the center. The bearing 29 is preferably provided in an upper part of the bearing hole 23. In addition to the bearing 29, an additional bearing may be provided between the bearing hole 23 and the rotor shaft 15. The additional bearing is preferably provided in a lower part of the bearing hole 23.

The drive unit 18 includes an electric motor 31 and a speed reducer 32 that decelerates the driving force of the electric motor 31 and transfers the decelerated driving force to the rotor shaft 15. An output shaft of the speed reducer 32 constitutes an output shaft of the drive unit 18. The output shaft of the drive unit 18 is detachably connected to the rotor shaft 15.

The speed reducer 32 is detachably mounted to the support part 14 or the base 11. In the present embodiment, the speed reducer 32 is detachably mounted to the support part 14. The electric motor 31 is detachably mounted to the speed reducer 32. The output shaft of the electric motor 31 is detachably connected to the input shaft of the speed reducer 32. The electric motor 31, the speed reducer 32, and the rotor shaft 15 are arranged coaxially along an axis A. The speed reducer 32 is mounted to the lower end of the support part 14, and the electric motor 31 is mounted to the lower end of the speed reducer 32. An upper part of the drive unit 18 is constituted of the speed reducer 32, and a lower part of the drive unit 18 is constituted of the electric motor 31. The lower end of the drive unit 18 is disposed lower than the base 11.

Each of the main body 21 of the support part 14 and the drive unit 18 is disposed to form a gap 34 between itself and the edge part 25 of the mounting hole 12. The gap 34 functions as an air passage. The air flowing downward from the multiple rotating blades 16 passes through the gap 34 and flows along the surface of the drive unit 18 to cool the drive unit 18.

The speed reducer 32 includes a speed reducer case 41. The speed reducer case 41 is formed in a cylindrical shape and extends in the up-down direction. The speed reducer case 41 includes a cylindrical peripheral wall 42 that extends vertically, an upper end wall 43 provided at the upper end of the peripheral wall 42, and a lower end wall 44 provided at the lower end of the peripheral wall 42. The upper end wall 43 of the speed reducer case 41 is detachably mounted to the lower surface of the flange 24 of the support part 14. Preferably, the support part 14 and the speed reducer case 41 are detachably fastened to each other by multiple bolts 46. For example, the bolts 46 pass through bolt holes formed in the flange 24 and are threadedly engaged with female threaded holes formed in the upper end surface of the speed reducer case 41.

The upper end wall 43 of the speed reducer case 41 is formed with an upper bearing hole 51 penetrating therethrough vertically. The lower end wall 44 of the speed reducer case 41 is formed with a lower bearing hole 52 penetrating therethrough vertically. The upper bearing hole 51 and the lower bearing hole 52 are connected to an inner space 53 of the speed reducer case 41. An upper part of the upper bearing hole 51 has a larger diameter than a lower part of the upper bearing hole 51 such that a step is formed therebetween.

The electric motor 31 includes a cylindrical motor case 55. The motor case 55 extends in the up-down direction. The upper end surface of the motor case 55 is detachably mounted to the lower surface of the lower end wall 44 of the speed reducer case 41. Preferably, the speed reducer case 41 and the motor case 55 are detachably fastened to each other by multiple bolts. The motor case 55 is preferably formed to have an outer diameter larger than the outer diameter of the speed reducer case 41. The lower end wall 44 of the speed reducer case 41 is preferably provided with multiple fastening flanges that protrude radially outward. Each fastening flange is formed with a bolt hole penetrating therethrough in the up-down direction, and the upper end surface of the motor case 55 is formed with female threaded holes. Preferably, bolts are passed through the bolt holes of the fastening flanges and are detachably engaged with the female threaded holes of the motor case 55.

A motor output shaft 61, which is the output shaft of the electric motor 31, extends in the up-down direction and protrudes upward from the upper end surface of the motor case 55.

The speed reducer 32 consists of a planetary gear mechanism. The speed reducer 32 includes a first shaft 63 rotatably supported by the speed reducer case 41. The first shaft 63 extends vertically. The first shaft 63 has a first connection part 64 at the lower end thereof and a connecting shaft 65 at the upper end thereof. The first shaft 63 constitutes the input shaft of the speed reducer 32. The first connection part 64 is rotatably supported in the lower bearing hole 52 of the speed reducer case 41 via a bearing 66. Preferably, an oil seal 67 is provided between the first connection part 64 of the first shaft 63 and the lower bearing hole 52.

The first connection part 64 is coaxially connected to the motor output shaft 61. The first shaft 63 and the motor output shaft 61 are fitted to each other and rotate integrally. For example, the first connection part 64 has a polygonal hole recessed in the axial direction, and the motor output shaft 61 has a polygonal column part fitted into the polygonal hole. The fitting part between the motor output shaft 61 and the first shaft 63 may have any shape so long as they can be attached to and detached from each other in the axial direction, and the motor output shaft 61 and the first shaft 63 may be fitted to each other by so-called spline fitting in which thin ridges and grooves extending in the axial direction mesh with one another.

The speed reducer 32 includes a second shaft 71 rotatably supported by the speed reducer case 41. The second shaft 71 is disposed coaxially with the first shaft 63. The second shaft 71 is disposed above the first shaft 63 and extends vertically. The second shaft 71 has a second connection part 72 at the upper end thereof and a receiving hole 73 at the lower end thereof to rotatably receive the connecting shaft 65. The second shaft 71 constitutes the output shaft of the speed reducer 32. The receiving hole 73 is recessed upward from a lower end surface 71A of the second shaft 71. The receiving hole 73 is a circular hole coaxial with the second shaft 71. An outer circumferential surface of the connecting shaft 65 and an inner circumferential surface of the receiving hole 73 slidably contact each other.

Figure 5:
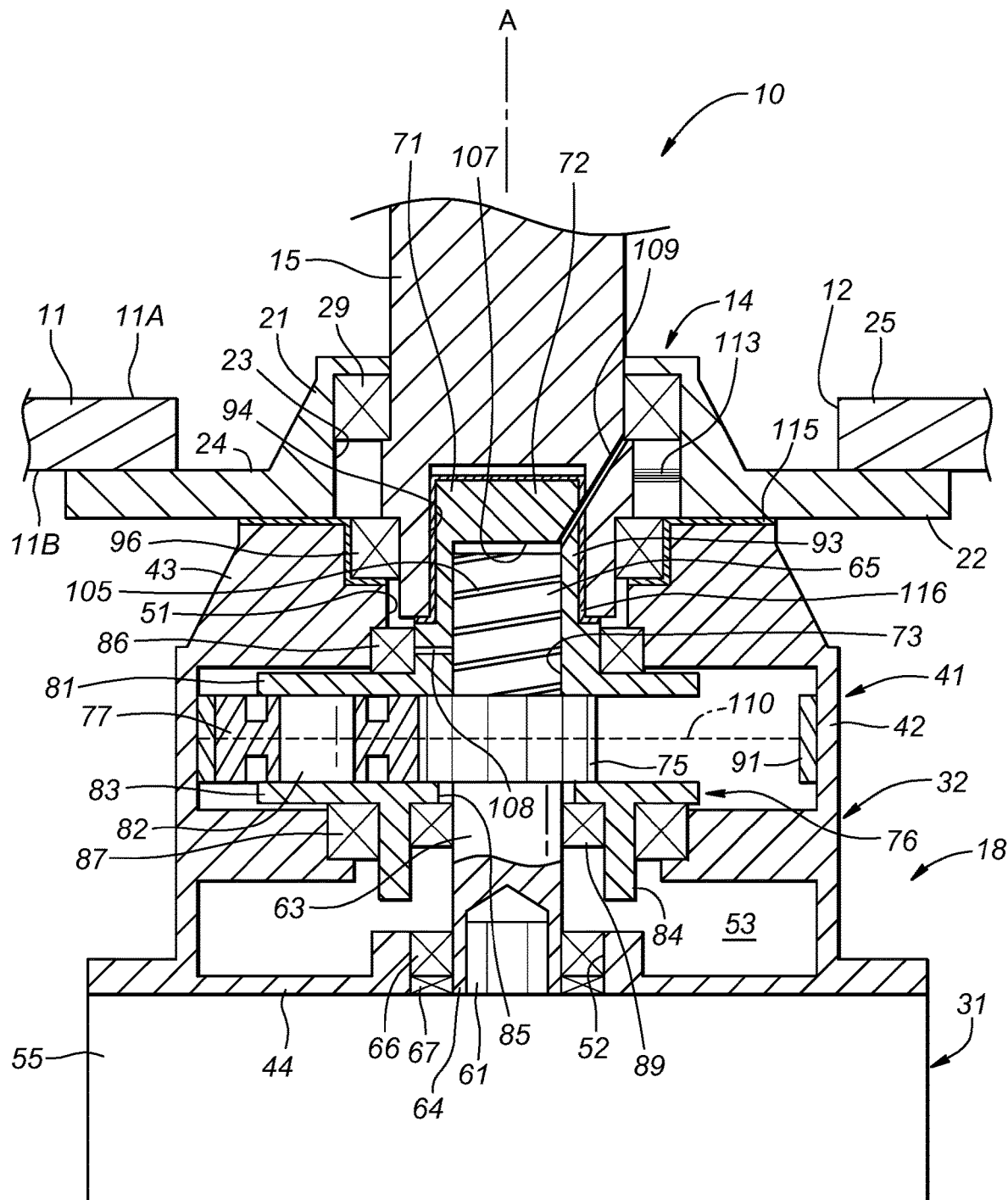
FIG. 5 is a vertical sectional view of the thrust generator.
Figure 7:
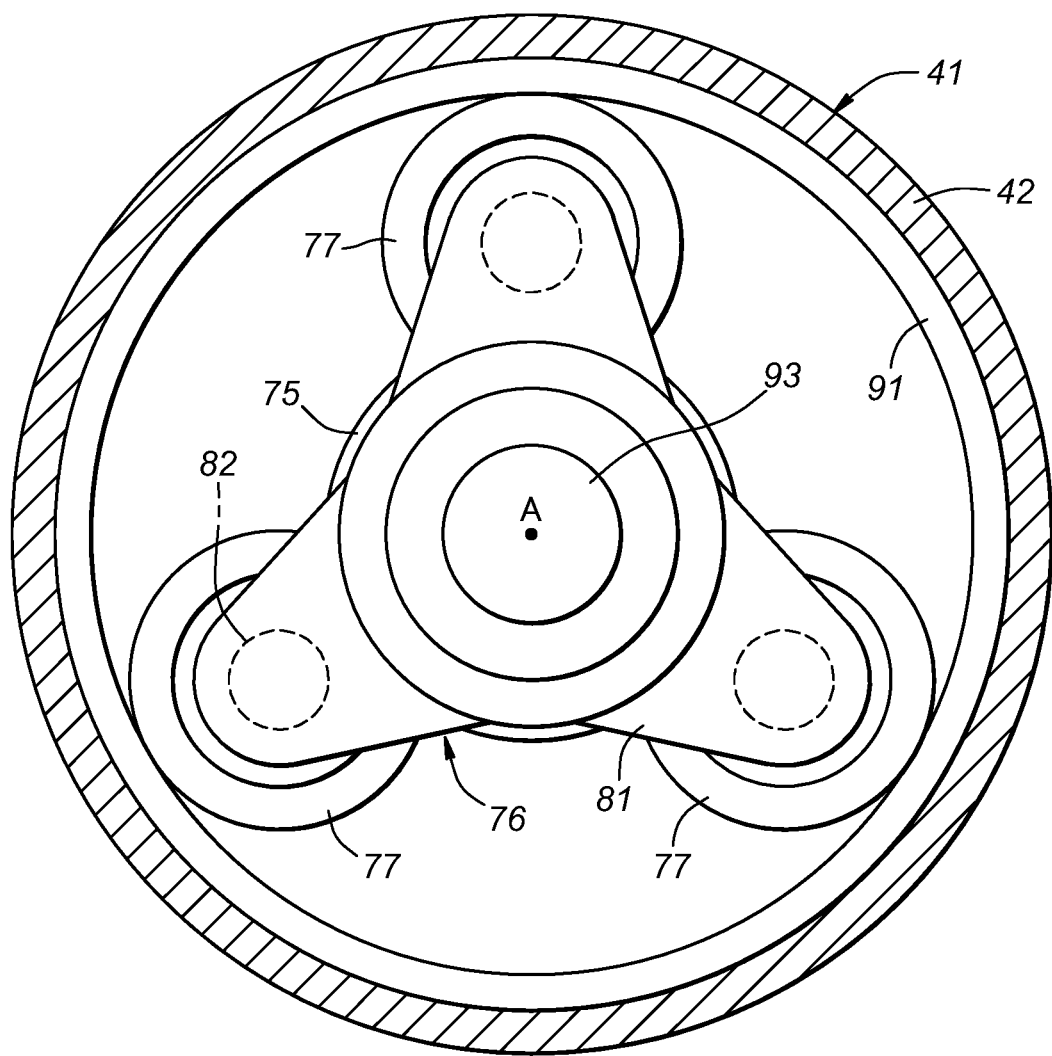
FIG. 7 is a horizontal sectional view of a speed reducer.
Figure 8:
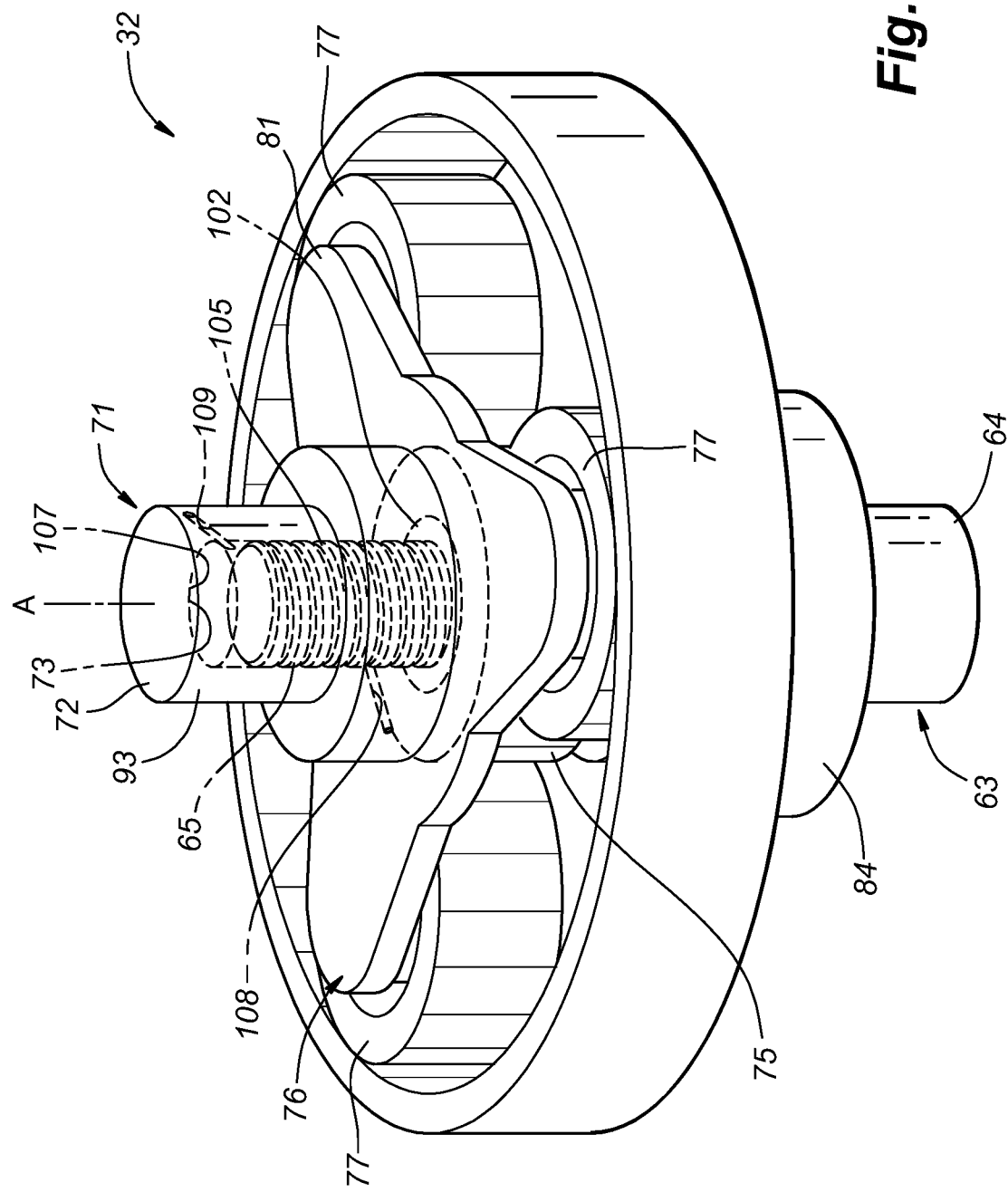
FIG. 8 is an explanatory diagram showing a main part of the speed reducer.

As shown in FIGS. 5, 7, and 8, a sun gear 75 is joined to the first shaft 63. The sun gear 75 is preferably provided directly under the connecting shaft 65. The sun gear 75 is a spur gear coaxial with the first shaft 63.

A planetary carrier 76 is joined to the second shaft 71. The planetary carrier 76 rotatably supports multiple planetary gears 77. Each planetary gear 77 is a spur gear. In the present embodiment, the speed reducer 32 includes three planetary gears 77. The planetary carrier 76 is joined to the outer circumferential surface of the lower end of the second shaft 71.

The planetary carrier 76 includes a first plate 81 having a circular annular shape and joined to the lower end of the second shaft 71, multiple support shafts 82 extending downward from the first plate 81, a second plate 83 joined to the lower ends of the multiple support shafts 82, and a cylindrical extension tube 84 extending downward from the second plate 83. The first plate 81 is formed in a flat plate shape facing up and down, and extends radially outward from an outer peripheral part of the lower end of the second shaft 71. The multiple support shafts 82 are disposed in parallel with the second shaft 71, and are arranged at equal intervals in the circumferential direction about the second shaft 71. Each support shaft 82 is formed in a cylindrical columnar shape. The second plate 83 is formed in a flat plate shape facing up and down. The second plate 83 is disposed to be spaced from and in parallel with the first plate 81. A central part of the second plate 83 is formed with a through hole 85 penetrating therethrough vertically.

In an upper part of the speed reducer case 41, a bearing 86 for rotatably supporting the second shaft 71 is provided. The bearing 86 is provided in a lower part of the upper bearing hole 51 and rotatably supports a lower part of the second shaft 71. The extension tube 84 is rotatably supported by an inner surface of the speed reducer case 41 via a bearing 87.

The first shaft 63 extends vertically to pass through the through hole 85 of the second plate 83 and the interior of the extension tube 84. Preferably, a bearing 89 is provided between the first shaft 63 and the through hole 85 of the second plate 83. The sun gear 75 is disposed between the first plate 81 and the second plate 83. The sun gear 75 is engaged with each of the multiple planetary gears 77.

A ring gear 91 is provided on the inner surface of the speed reducer case 41. The ring gear 91 is an internal gear and is disposed coaxially with the sun gear 75 and the planetary gears 77. The ring gear 91 is engaged with the multiple planetary gears 77. The ring gear 91 is joined to an inner surface of the peripheral wall 42.

The lower end of the rotor shaft 15 protrudes into the upper bearing hole 51 of the speed reducer case 41 and is detachably joined to the upper end of the second shaft 71. One of the rotor shaft 15 and the second shaft 71 (the output shaft of the drive unit 18) is provided with a spline shaft part 93, and the other of the rotor shaft 15 and the second shaft 71 is provided with a spline hole 94 into which the spline shaft part 93 is fitted. In the present embodiment, the spline shaft part 93 is provided at the upper end of the second shaft 71, and the spline hole 94 is provided at the lower end of the rotor shaft 15. Due to fitting of the spline shaft part 93 in the spline hole 94, the rotor shaft 15 rotates integrally with the second shaft 71. The lower end part of the rotor shaft 15 is rotatably supported in the upper part of the upper bearing hole 51 via a bearing 96.

The bearings 29, 96 are preferably bearings capable of supporting radial and axial loads. Preferably, the bearings 29, 96 are tapered roller bearings or angular contact ball bearings, for example. The bearings 66, 86, 87, 89 are preferably bearings capable of supporting a radial load. Preferably, the bearings 66, 86, 87, 89 are ball bearings or plain bearings, for example.

Figure 6:
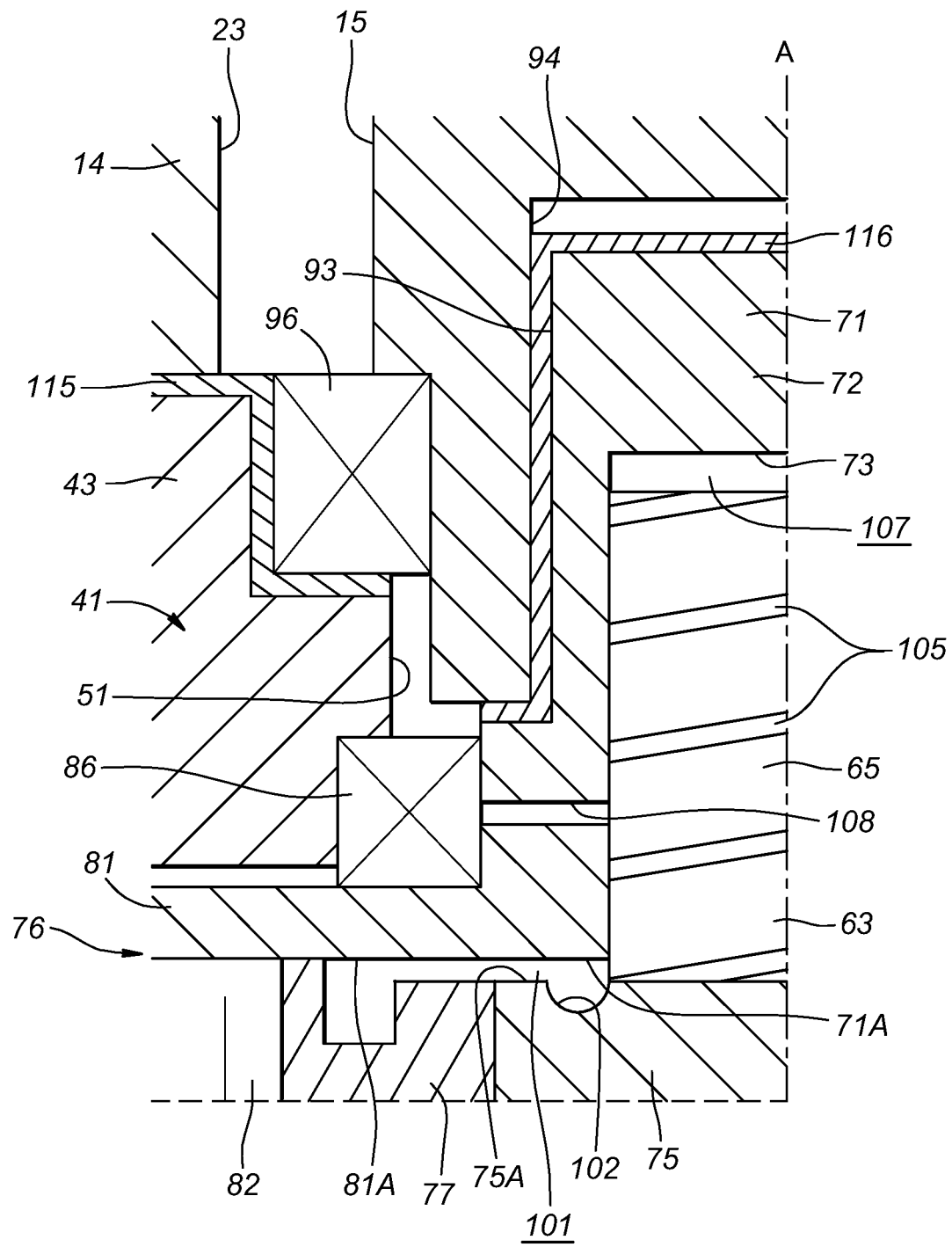
FIG. 6 is an enlarged vertical sectional view showing a main part of the thrust generator.

As shown in FIG. 6, a gap 101 is formed between the upper surface 75A of the sun gear 75 and the lower end surface 71A of the second shaft 71. The lower end surface 71A of the second shaft 71 is disposed on the same plane as the lower surface 81A of the first plate 81. Therefore, the gap 101 is also formed between the upper surface 75A of the sun gear 75 and the lower surface 81A of the first plate 81. An inner peripheral part of the upper surface 75A of the sun gear 75 is formed with a lubricating oil groove 102 that is recessed downward and extends annularly so as to surround the connecting shaft 65. The lubricating oil groove 102 opposes the gap 101.

One of the connecting shaft 65 and the receiving hole 73 is formed with a helical groove 105 that extends vertically in a helical manner about the connecting shaft 65. The lower end of the helical groove 105 is in contact with the gap 101. Namely, the lower end of the helical groove 105 reaches the upper surface 75A of the sun gear 75. Also, the lower end of the helical groove 105 is preferably connected to the lubricating oil groove 102. The upper end of the helical groove 105 reaches the tip of the connecting shaft 65. An oil chamber 107 is formed between the tip of the connecting shaft 65 and the bottom of the receiving hole 73.

As shown in FIGS. 5 and 8, the second shaft 71 is formed with a first lubricating oil passage 108 which extends from the helical groove 105 to the sliding contact parts of the second shaft 71 and the speed reducer case 41. Preferably, the first lubricating oil passage 108 is connected to the helical groove 105 directly or via the oil chamber 107. In the present embodiment, the first lubricating oil passage 108 extends linearly from the helical groove 105 to the bearing 86.

In the second shaft 71 and the rotor shaft 15, a second lubricating oil passage 109 that extends from the helical groove 105 to the sliding contact parts of the rotor shaft 15 and the support part 14 is formed. The second lubricating oil passage 109 is preferably connected to the helical groove 105 directly or via the oil chamber 107. In the present embodiment, the second lubricating oil passage 109 extends linearly from the oil chamber 107 to the bearing 96.

In the speed reducer case 41, lubricating oil is stored. When the first shaft 63 is rotating, at least a part of each of the multiple planetary gears 77 is immersed in the lubricating oil. As shown in FIG. 5, the oil surface 110 of the lubricating oil is at the same height as the multiple planetary gears 77.

In the following, a lightning surge protection structure of the thrust generator 10 is described. The skeleton and the outer surface of each of the main body 2, the front wing 3, the rear wing 4, and the arms 5 of the rotorcraft 1 are made of conductive metal. For example, the metal may be iron, aluminum, or the like. The base 11 forming a part of each arm 5 is also made of conductive metal.

Figure 3:
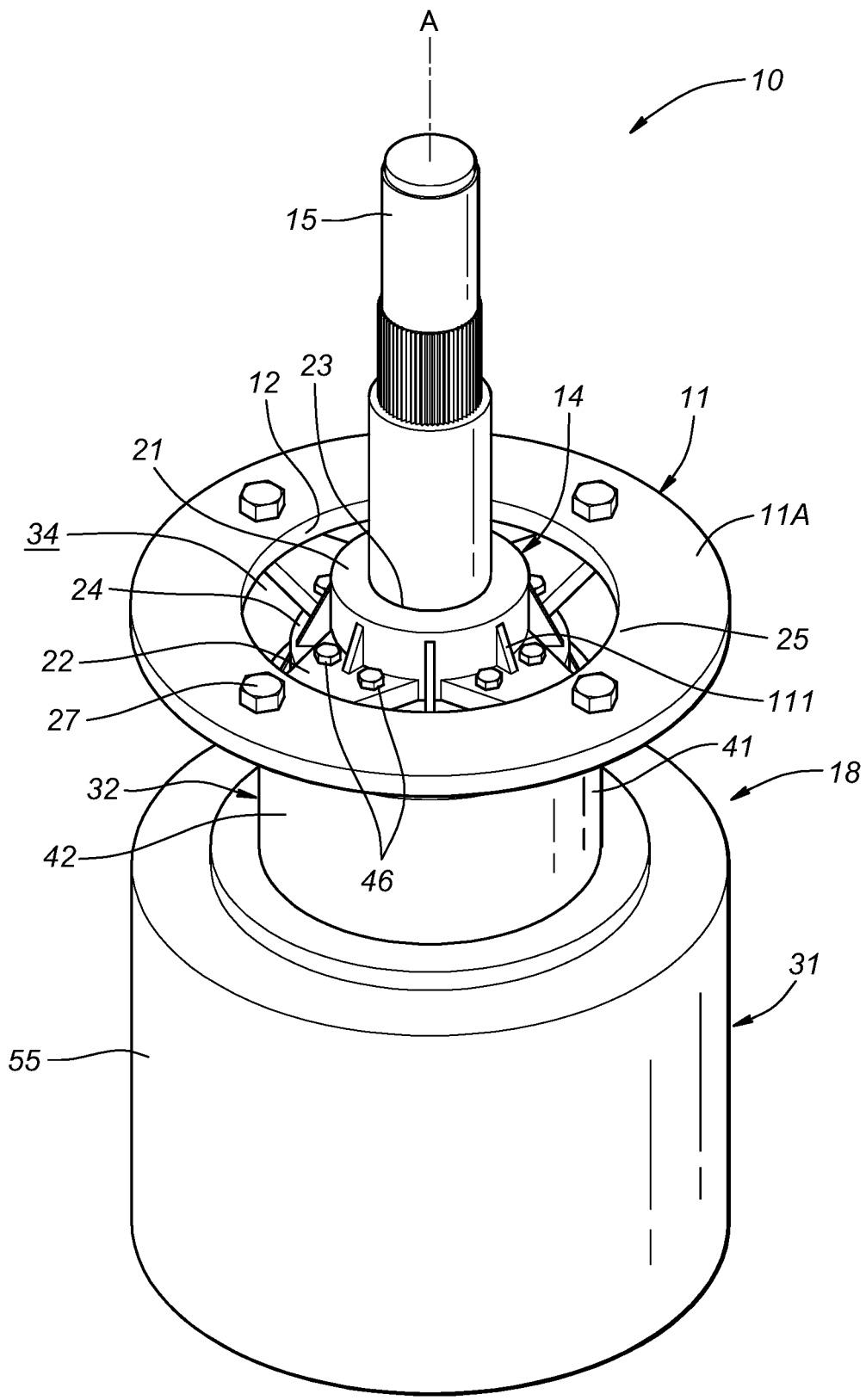
FIG. 3 is an enlarged perspective view of the thrust generator with rotating blades omitted.
Figure 4:
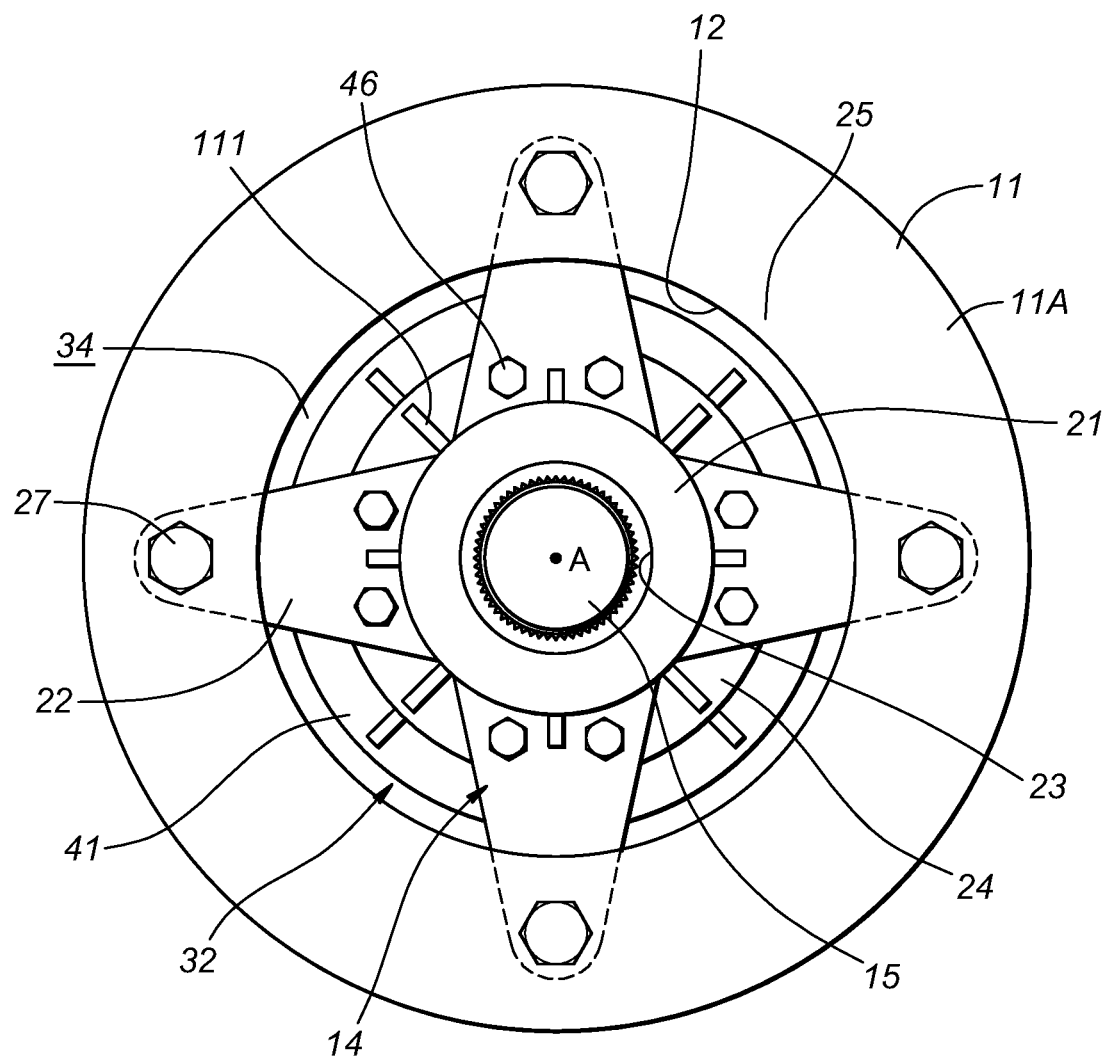
FIG. 4 is a plan view of the thrust generator with the rotating blade omitted.

As shown in FIG. 5, the rotor shaft 15, the multiple rotating blades 16, and the support part 14, which configure the thrust generator 10, are made of conductive metal. The support part 14 is conductively mounted to the base 11. Specifically, the support part 14 conductively contacts the base 11 at the multiple arm parts 22. As shown in FIG. 3, each arm part 22 is provided with a rib 111 extending from the main body 21 toward the tip of the arm part 22. The rib 111 enlarges the cross-sectional area of the arm part 22 and reduces the electrical resistance of the arm part 22. The rib 111 also functions as a reinforcement structure for the main body 21 and the arm part 22. The height of the rib 111 decreases toward the tip of the arm part 22.

As shown in FIG. 5, the rotor shaft 15 is conductively supported by the support part 14. Specifically, the bearing 29 provided between the rotor shaft 15 and the support part 14 is electrically conductive, and the rotor shaft 15 is conductively connected to the support part 14 via the bearing 29. Also, the support part 14 may be provided with a conductive brush 113 that slidably contacts the outer circumferential surface of the rotor shaft 15.

The drive unit 18 is mounted to the support part 14 via a first electrically insulating part 115. The first electrically insulating part 115 may be an electrically insulating material that is independent from and interposed between the support part 14 and the drive unit 18. Also, the first electrically insulating part 115 may be an electrically insulating film formed on the surface of at least one of the support part 14 and the drive unit 18.

The second shaft 71, which constitutes the output shaft of the drive unit 18, is connected to the rotor shaft 15 via a second electrically insulating part 116. The second electrically insulating part 116 may be an electrically insulating material that is independent from and interposed between the second shaft 71 and the rotor shaft 15. Also, the second electrically insulating part 116 may be an electrically insulating film formed on the surface of at least one of the second shaft 71 and the rotor shaft 15.

The electrically insulating material is preferably made of ceramic or rubber, for example. The electrically insulating film preferably is a phosphate film (such as a manganese phosphate film) or an alumite film, for example.

The first electrically insulating part 115 preferably is an electrically insulating material interposed between the speed reducer case 41 and the support part 14, for example. The first electrically insulating part 115 preferably includes a bush provided between each of the bolts 46, which fasten the speed reducer case 41 to the support part 14, and the support part 14. The bush is made of an electrically insulating material and prevents the bolt 46 from contacting the support part 14. Also, the first electrically insulating part 115 is preferably interposed between the speed reducer case 41 and the bearing 96.

The first electrically insulating part 115 may be an electrically insulating film formed on the contact parts of the speed reducer case 41 and the support part 14, the contact parts of the speed reducer case 41 and the bearing 96, and the contact parts of the speed reducer case 41 and the bolts 46.

The second electrically insulating part 116 preferably is an electrically insulating film formed on at least one of the spline shaft part 93 and the spline hole 94. Thereby, it is possible to connect the rotor shaft 15 to the second shaft 71, which is the output shaft of the drive unit 18, in an electrically insulated state, while suppressing increase in size.

Since the multiple rotating blades 16 and the rotor shaft 15 are disposed higher than the drive unit 18, lightning is more likely to strike the rotating blades 16 and the rotor shaft 15 than the drive unit 18. Due to the first electrically insulating part 115 and the second electrically insulating part 116, lightning surge generated in the rotating blades 16 and the rotor shaft 15 flows more easily to the base 11 than to the drive unit 18, whereby the drive unit 18 is protected from the lightning surge. Also, since the support part 14 and the drive unit 18 can be arranged close to each other, increase in size of the thrust generator 10 can be suppressed. Thus, in the thrust generator 10, it is possible to prevent the lightning surge from flowing to the drive unit 18 while suppressing increase in size.

Since the ribs 111 increase the cross-sectional area of the arm parts 22, the electrical resistance of the arm parts 22 is lowered. Thus, lightning surge easily flows to the base 11 via the arm parts 22. The brush 113 electrically connects the rotor shaft 15 and the support part 14. Therefore, lightning surge flows more easily from the rotor shaft 15 to the support part 14 than to the second shaft 71.

Each of the drive unit 18 and the second shaft 71, which constitutes the output shaft of the drive unit 18, is preferably made of a material having an electrical conductivity lower than that of the base 11. Thereby, lightning surge flows more easily from the rotor shaft 15 and the support part 14 to the base 11 than to the drive unit 18 and the second shaft 71.

In the following, operation and effects of the thrust generator 10 will be described. The driving force of the electric motor 31 is decelerated by the speed reducer 32 and is transmitted to the rotor shaft 15. Due to rotate of the rotor shaft 15 having the multiple rotating blades 16, the thrust generator 10 generates a thrust in the up-down direction.

In the speed reducer 32, when the first shaft 63 having the sun gear 75 rotates, the multiple planetary gears 77 rotate and the planetary carrier 76, which support the multiple planetary gears 77, and the second shaft 71 rotate. At this time, at least a part of each planetary gear 77 is immersed in the lubricating oil, and therefore, the lubricating oil adhering to each planetary gear 77 is scattered radially outward of each planetary gear 77. Therefore, as shown in FIG. 6, the lubricating oil enters the gap 101 between the upper surface 75A of the sun gear 75 and the lower end surface 71A of the second shaft 71, and reaches the lower end of the helical groove 105. Since the rotational speed of the second shaft 71 is reduced relative to the rotational speed of the first shaft 63 by a reduction ratio determined by the number of teeth of each gear, the connecting shaft 65 rotates relative to the receiving hole 73. Thus, the connecting shaft 65, the receiving hole 73, and the helical groove 105 function as a screw pump to feed the lubricating oil to the top side of the connecting shaft 65. This allows the lubricating oil to be sent to the bearing 86 through the first lubricating oil passage 108 connected to the helical groove 105. Thereby, the bearing 86 is lubricated.

Also, as shown in FIG. 5, the lubricating oil in the helical groove 105 is sent to the bearing 29 via the oil chamber 107 and the second lubricating oil passage 109. Thereby, the bearing 29 is lubricated. The lubricating oil supplied to the bearing 29 flows downward due to the gravity to pass the bearing 96 and the bearing 86 provided below the bearing 29. Thereby, the bearing 96 is lubricated. The oil chamber 107 retains the lubricating oil. Therefore, it is possible to supply the lubricating oil to the second lubricating oil passage 109 more reliably.

The first plate 81 of the planetary carrier 76 provided at the lower end of the second shaft 71 guides the lubricating oil scattered from each planetary gear 77 to the gap 101. This facilitates the supply of the lubricating oil to the lower end of the helical groove 105. The lubricating oil groove 102 holds the lubricating oil at the lower end portion of the connecting shaft 65. This facilitates the supply of the lubricating oil to the lower end of the helical groove 105.

As described above, a pump transporting for the lubricating oil is formed by using the first shaft 63 and the second shaft 71 which constitute the input shaft and the output shaft of the planetary gear mechanism. Therefore, in the speed reducer 32, the size of the lubrication structure can be made compact. The bearings 66, 87, 89 are in the lubricating oil, and are lubricated.

Figure 9:
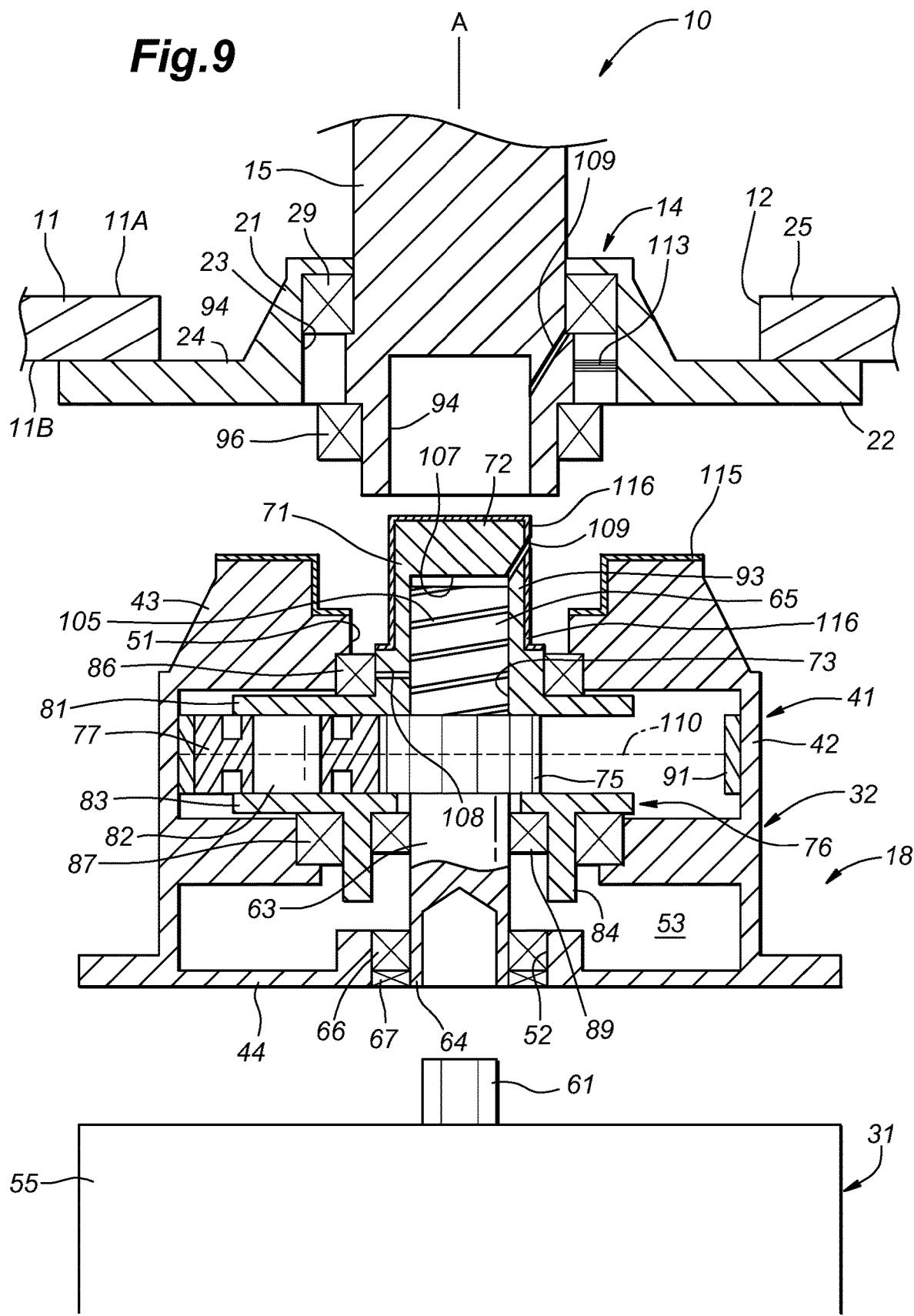
FIG. 9 is a vertical sectional view of the thrust generator in a state in which the speed reducer and the electric motor are separated from a support part.

As shown in FIG. 9, in the thrust generator 10, only the drive unit 18 can be removed from the support part 14 and the base 11 while the support part 14 is left on the base 11. Therefore, when the drive unit 18 is removed from the support part 14 and the base 11, the rotating blades 16 and the rotor shaft 15 do not need to be removed from the base 11. Therefore, in the thrust generator 10 for the rotorcraft 1, the maintenance workability of the drive unit 18 can be improved.

Further, only the electric motor 31 can be removed while the speed reducer 32 is left on the support part 14. The electric motor 31, the speed reducer 32, and the rotor shaft 15 are arranged coaxially. Therefore, the direction in which the speed reducer 32 is removed from the rotor shaft 15 and the support part 14 is the same as the direction in which the electric motor 31 is removed from the rotor shaft 15 and the support part 14, and thus, the removal work and the mounting work are easy.

Each of the bolts 46 for mounting the speed reducer 32 to the support part 14 is disposed in a position overlapping with the mounting hole 12 as seen from above. Therefore, the worker can attach and detach the bolts 46 from above the mounting hole 12.

Concrete embodiments of the present invention have been described in the foregoing, but the present invention may be modified or altered in various ways without being limited to the above embodiments. For example, the bearing 86 may be supported on the main body 21 of the support part 14. Also, each arm part 22 of the support part 14 may be joined to the upper surface 11A of the base 11. In this case, the upper part of the speed reducer 32 may be disposed in the mounting hole 12.

The invention claimed is:

1. A thrust generator for a rotorcraft, the thrust generator comprising:
   a support part conductively mounted to a conductive base provided in the rotorcraft;
   a rotor shaft rotatably and conductively supported by the support part;
   multiple rotating blades joined to the rotor shaft; and
   a drive unit mounted to the support part via a first electrically insulating part,
   wherein an output shaft of the drive unit is connected to the rotor shaft via a second electrically insulating part in an electrically insulated state,
   one of the rotor shaft and the output shaft of the drive unit is provided with a spline shaft part,
   another of the rotor shaft and the output shaft of the drive unit is provided with a spline hole into which the spline shaft part is fitted,
   the second electrically insulating part is an electrically insulating film formed on at least one of the spline shaft part and the spline hole,
   the output shaft of the drive unit is provided with the spline shaft part and a base part having a larger diameter than the spline shaft part,
   the rotor shaft is provided with the spline hole,
   the electrically insulating film is formed on an outer peripheral surface and an end surface of the spline shaft part and on an end surface of the base part,
   the end surface of the base part abuts against an end surface of the rotor shaft via the electrically insulating film, and
   a gap is formed between the end surface of the spline shaft part and the bottom surface of the spline hole.

2. The thrust generator according to claim 1, wherein the first electrically insulating part is an electrically insulating material that is independent from and interposed between the support part and the drive unit.

3. The thrust generator according to claim 1, wherein the first electrically insulating part is an electrically insulating film formed on at least one of the support part and the drive unit.

4. The thrust generator according to claim 1, wherein the base has a mounting hole penetrating therethrough in an up-down direction, the support part includes a main body that is tubular in shape and rotatably supports the rotor shaft and multiple arm parts extending radially outward from the main body, the multiple arm parts are mounted to an edge part of the mounting hole, and each arm part is provided with a rib extending from the main body toward a tip of the arm part.

5. The thrust generator according to claim 4, wherein the rotor shaft extends upward from the mounting hole, the rotating blades are joined to an upper end of the rotor shaft, and a lower end of the drive unit is disposed lower than the base.

6. The thrust generator according to claim 1, wherein the support part is provided with a conductive brush that slidably contacts an outer circumferential surface of the rotor shaft.

7. The thrust generator according to claim 1, wherein each of the drive unit and the output shaft is made of a material having an electrical conductivity lower than that of the base.

\* \* \* \* \*